(12) United States Patent
Spomer et al.

(10) Patent No.: US 11,060,955 B2
(45) Date of Patent: Jul. 13, 2021

(54) MICROTOME AND METHOD FOR PRODUCING THIN SECTIONS FROM A SAMPLE BY MEANS OF A MICROTOME

(71) Applicants: Karlsruher Institut fuer Technologie, Karlsruhe (DE); UNIVERSITÄT HEIDELBERG, Heidelberg (DE)

(72) Inventors: Waldemar Spomer, Baden-Baden (DE); Ulrich Gengenbach, Remchingen (DE); Julian Hoffmann, Karlsruhe (DE); Andreas Hofmann, Karlsruhe (DE); Leonard J. Ness, Tuscon, AZ (US); Warren J. P. Brey, Corataro, AZ (US); Rasmus Schroeder, Heidelberg (DE); Irene Wacker-Schroeder, Heidelberg (DE)

(73) Assignee: KARLSRUHER INSTITUT FUER TECHNOLOGIE, Karlsruhe (DE)

( * ) Notice: Subject to any disclaimer, the term of this patent is extended or adjusted under 35 U.S.C. 154(b) by 0 days.

(21) Appl. No.: 16/770,982

(22) PCT Filed: Dec. 11, 2018

(86) PCT No.: PCT/EP2018/000552
§ 371 (c)(1),
(2) Date: Jun. 9, 2020

(87) PCT Pub. No.: WO2019/115007
PCT Pub. Date: Jun. 20, 2019

(65) Prior Publication Data
US 2020/0378871 A1    Dec. 3, 2020

(30) Foreign Application Priority Data

Dec. 12, 2017 (DE) .......................... 102017129537.2

(51) Int. Cl.
*G01N 1/06* (2006.01)
*G01N 1/18* (2006.01)

(52) U.S. Cl.
CPC ......... *G01N 1/06* (2013.01); *G01N 2001/065* (2013.01); *G01N 2001/185* (2013.01)

(58) Field of Classification Search
CPC ............................................... G01N 2001/185
See application file for complete search history.

(56) References Cited

U.S. PATENT DOCUMENTS

| 3,540,335 A | 11/1970 | Sitte |
| 3,832,923 A | 9/1974 | Lassmann et al. |

(Continued)

FOREIGN PATENT DOCUMENTS

| AT | 507572 A4 | 6/2010 |
| DE | 1993223 U | 9/1968 |

(Continued)

*Primary Examiner* — Daniel S Larkin
(74) *Attorney, Agent, or Firm* — Leydig, Voit & Mayer, Ltd.

(57) ABSTRACT

A microtome for producing thin sections from a sample includes a sample holder configured to receive the sample and a cutting edge configured to cut the sample, the cutting edge having a specified cutting direction, the cutting direction and the cutting edge spanning a cutting plane. The microtome further includes a movement device configured to produce a relative movement between the sample holder and the cutting unit for cutting the sample in the cutting direction, a feed device configured to produce a relative movement between the sample holder and the cutting edge for cutting the sample in a feed direction at an angle not equal to 0° to the cutting plane, and a liquid volume with a liquid abutting the cutting edge on a side of the cutting edge facing away from the sample holder.

16 Claims, 3 Drawing Sheets

(56) References Cited

U.S. PATENT DOCUMENTS

| | | | |
|---|---|---|---|
| 5,713,255 | A | 2/1998 | Izvozichikov et al. |
| 5,906,148 | A | 5/1999 | Aihara et al. |
| 7,616,302 | B2 * | 11/2009 | Miyatani ............ B01L 3/50855 |
| | | | 204/403.01 |
| 2006/0086221 | A1 * | 4/2006 | Kong ...................... G01N 1/06 |
| | | | 83/401 |
| 2011/0067537 | A1 | 3/2011 | Loydold et al. |
| 2013/0019725 | A1 * | 1/2013 | Magavi .................. G01N 1/312 |
| | | | 83/24 |
| 2014/0026683 | A1 | 1/2014 | Hayworth et al. |
| 2015/0135917 | A1 | 5/2015 | Hess et al. |
| 2015/0241324 | A1 * | 8/2015 | Orfield ............. G01N 35/00029 |
| | | | 356/246 |
| 2015/0338316 | A1 * | 11/2015 | Chen ................... B26D 7/1845 |
| | | | 83/24 |
| 2016/0231206 | A1 | 8/2016 | Alessi et al. |

FOREIGN PATENT DOCUMENTS

| | | |
|---|---|---|
| DE | 2200415 C3 | 1/1978 |
| DE | 19707987 A1 | 7/1998 |
| EP | 0649522 A1 | 4/1995 |
| EP | 3076150 A1 | 10/2016 |
| WO | WO 9401751 A1 | 1/1994 |

* cited by examiner

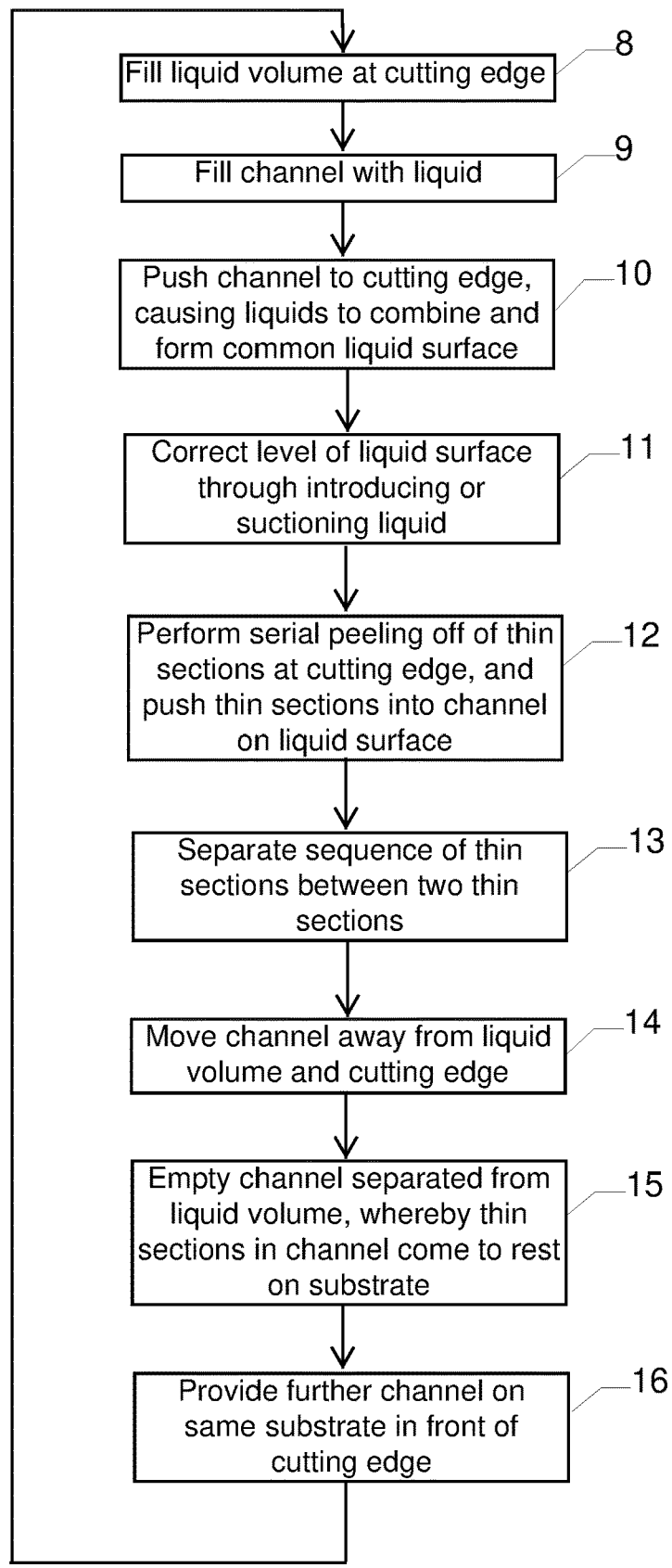

MICROTOME AND METHOD FOR PRODUCING THIN SECTIONS FROM A SAMPLE BY MEANS OF A MICROTOME

CROSS REFERENCE TO RELATED APPLICATIONS

This application is a U.S. National Phase Application under 35 U.S.C. § 371 of International Application No. PCT/EP2018/000552, filed on Dec. 11, 2018, and claims benefit to German Patent Application No. DE 10 2017 129 537.2, filed on Dec. 12, 2017. The International Application was published in German on Jun. 20, 2019 as WO 2019/115007 A1 under PCT Article 21(2).

FIELD

The invention relates to a microtome for producing thin sections from a sample according and to a method for producing thin sections from a sample by means of such a microtome.

BACKGROUND

A microtome is a cutting tool for the production of thin-cut preparations (thin sections). Samples, preferably containing materials science samples, biological tissue and/or polymers, are fixed and clamped in a sample holder and guided over a cutting edge by which the sample is peeled off in layers as thin sections. Usually, the individually peeled-off thin sections are guided from the cutting edge away from the cutting edge directly onto a liquid surface, separated from the cutting edge manually, e.g. by an eyelash manipulator, or automatically, e.g. by means of a micromanipulator, from the cutting edge and guided over the liquid surface onto a substrate or a substrate strip and deposited out of the liquid.

Typically, biological samples are not suitable for direct cutting at room temperature without any pretreatment. Their mechanical stability is often insufficient to cut them. Tissue samples or muscle cells can be named as examples here. Biological samples are also subject to decomposition. The first step in the production of section series is therefore to fix the sample in order to stop decomposition, the second to embed the sample in a suitable medium, an embedding material preferably based on a cuttable polymer (e.g., epoxy resin, methacrylate resin) which at the same time has a preservative effect on the sample.

The aforementioned cutting process is usually repeated on a sample, thus obtaining a plurality of serially peeled-off thin sections of the same sample and thus a basis for a three-dimensional reconstruction of a state of this sample. The thin sections must then each be separated individually and deposited onto substrates or substrate strips on which they are arranged serially and delivered for further examination, e.g. microscopic examinations.

US 2014/0026683 A1, for example, discloses a device having a microtome of the type mentioned initially, in which a sample is transferred as described above into a plurality of thin sections, the thin sections being serially received from the liquid by means of a substrate strip and rolled up with the substrate strip. Depositing the thin sections on substrate strips is particularly associated with a considerable outlay on equipment. Furthermore, because of the proprietary substrate, this method is not suitable for the use of standard substrates, such as indium tin-coated glass substrates which are used both for light microscopy and electron microscopy and thus for correlative array tomography.

SUMMARY

In an embodiment, the present invention provides a microtome for producing thin sections from a sample. The microtome includes a sample holder configured to receive the sample and a cutting edge configured to cut the sample, the cutting edge having a specified cutting direction, the cutting direction and the cutting edge spanning a cutting plane. The microtome further includes a movement device configured to produce a relative movement between the sample holder and the cutting unit for cutting the sample in the cutting direction, a feed device configured to produce a relative movement between the sample holder and the cutting edge for cutting the sample in a feed direction at an angle not equal to 0° to the cutting plane, and a liquid volume with a liquid abutting the cutting edge on a side of the cutting edge facing away from the sample holder. In addition, the microtome includes a channel arranged laterally on the side of the cutting edge facing away from the sample holder and configured to move toward and/or away from the cutting edge at least via a back and forth movement. The channel is open toward the cutting edge as an open channel end and is configured to be filled with the liquid and/or a further liquid.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 2 is a flow chart of a preferred method of producing thin sections from a sample with the aid of a microtome;

DETAILED DESCRIPTION

Figure 1:
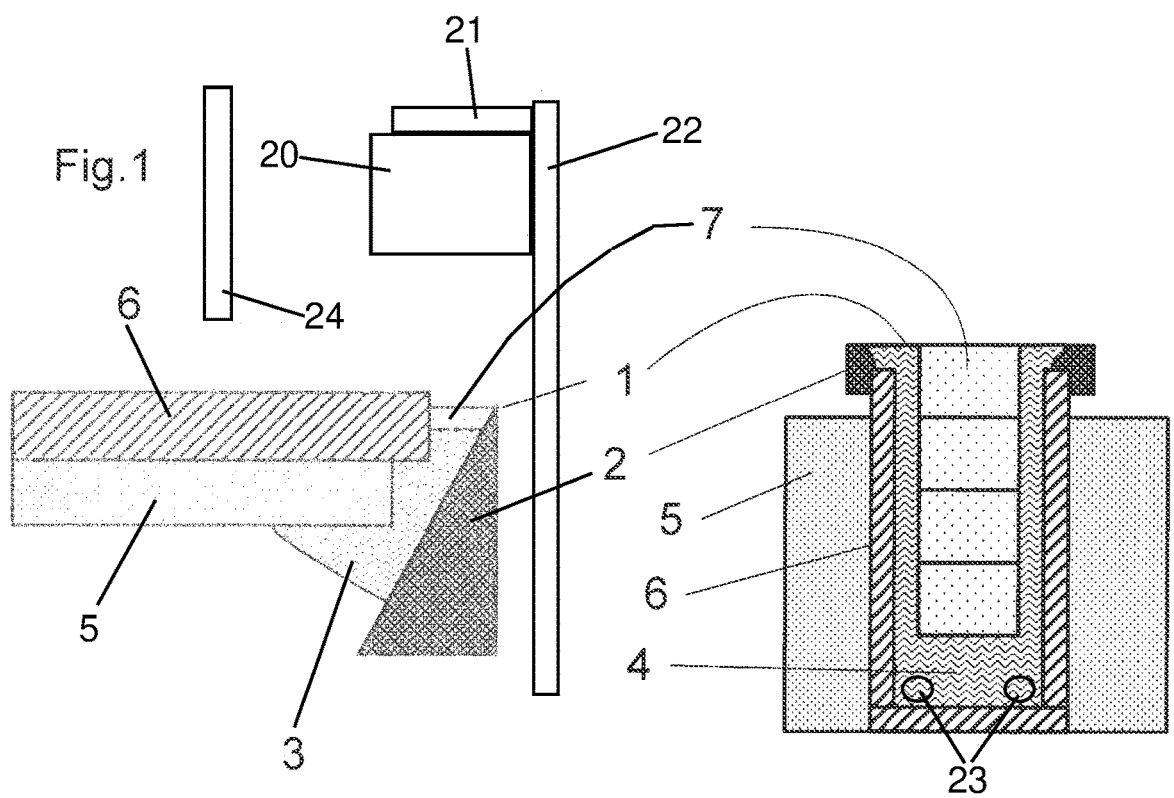
FIG. 1 is a schematic representation of a preferred embodiment of a microtome with peeled-off thin sections.

Generally, the aforementioned operation of a microtome to produce thin sections from a sample usually takes place manually or, if a substrate strip is used, in a partially automated manner, with the result that production and isolation of a plurality of thin sections quickly reach their limits.

Starting from this point, the present disclosure proposes a microtome that is not only suitable for serial production of thin sections without the aforementioned limitations and disadvantages but in particular also offers a basis for automatable production of even larger quantities of thin sections with consistent quality.

The present disclosure further contemplates the possibility of also depositing larger numbers in an ordered manner on preferably rigid substrates (ITO-coated glass or sections of silicon wafers), such as can be used as slides for light and/or electron microscopic post-examinations (LIM, SEM, etc.).

The present disclosure additionally contemplates the possibility of also depositing larger numbers in an ordered manner on preferably structured or composite rigid substrates, such as can be used as slides for transmission electron microscopic examinations (TEM).

The present disclosure further proposes a corresponding method for producing thin sections which is adapted in particular for better automation.

The present disclosure provides a microtome for producing thin sections from a sample, preferably a biological and/or polymeric sample as described above.

The microtome has a sample holder for receiving the sample. The sample is firmly incorporated into the sample holder, i.e. preferably secured against tipping and/or twisting. An optional embodiment provides for the sample to be incorporated into a matrix of a cuttable material, such as an epoxy resin matrix, and fixed in the sample holder by clamping.

The microtome also has a cutting edge for cutting the sample. The cutting edge is preferably straight and points in a predetermined cutting direction. The cutting direction and the cutting edge span a cutting plane. Even more preferably, the cutting edge is arranged horizontally and points upward, which in particular facilitates the subsequent embodiment of the transfer of the thin sections onto a substrate by means of a liquid surface.

The substrate is preferably a rigid substrate. Optional embodiments provide for this substrate to also be designed as a number ordered on preferably structured or composite rigid substrates, such as can be used as slides for transmission electron microscopic examinations (TEM). These include, for example,

- mains/grids with different dimensions and geometries and/or ultra-thin section supports,
- TEM grids lying directly on the substrate (channels are structured thereon),
- large elongated, self-supporting strip-shaped grid which is inherently rigid and forms a channel over the entire surface (grating, a plurality of these strip-shaped grids can also be arranged next to one another),
- substrate with recesses for TEM grids (round TEM grids, slot grids, slot grids with, for example, membrane coating (e.g., formvar and/or carbon films, strip-shaped grids),
- creating/structuring grids directly on the substrate (e.g., printing techniques or C-MEMS process), TEM sample holder.

In order to guide a sample in the sample holder to the cutting edge and to peel thin sections off the sample by a cutting process, a movement device is required for a relative movement between sample holder and cutting edge. A distinction is made here between a movement in or along the cutting direction, i.e., for the actual cutting process, and a feed direction for the sample holder, i.e., for implementing a feed between two cuts for adjusting the thickness of the respective thin section or for retracting the sample from the cutting edge in an orientation other than the cutting direction.

For the movement in the cutting direction, the microtome has a movement device for generating a relative movement between the sample holder and the cutting edge for cutting the sample. The movement in the cutting direction preferably runs planarly on the cutting plane, more preferably in a straight line. A further preferred embodiment provides for a two-dimensional path of the movement on the cutting plane, preferably in a circular or elliptical movement.

One embodiment provides for the movement device and/or the cutting edge to additionally be designed with a vibration generator, preferably a sound or ultrasound source, which assists the cutting process when peeling off the thin sections from the sample.

The movement in the cutting direction preferably also comprises the movement back, i.e., it starts from an initial position with a cutting movement comprising a movement of the sample to the cutting edge and the complete peeling off of the thin section from the sample during the cutting process, in which the cutting edge is pushed completely through the sample and penetrates it. After a target position is reached, the movement back takes place, in which the sample is moved back into the aforementioned initial position. If contact between the cutting edge and the cut surface formed on the sample by peeling off the thin section is to be avoided during the movement back, the cut surface is optionally moved away from the cutting plane by a feed movement before the initiation of the movement back.

The layer thickness for the thin sections is adjusted by a feed movement in the feed direction. For movement in the feed direction, the microtome has a feed device for generating a relative movement between the sample holder and the cutting unit in order to cut the sample in a feed direction at an angle not equal to 0°, preferably between 60 and 90° to the cutting plane. This movement adjusts the distance of the cut surface of the sample from the preceding cut to the cutting plane.

The aforementioned relative movements between the sample holder and the cutting unit preferably take place by means of motor drives of the sample holders with a stationary cutting edge. Particularly in the case of smaller or light samples, it is appropriate to combine the movement device and the feed device in a crank drive with a finely adjustable variable transmission ratio and to advantageously protect them together against soiling. The moving masses in this case comprise the sample holder and the sample.

Alternative embodiments of the device have separate devices for the movement device and the feed device. In this case, the aim is to keep the moving masses small, especially in the case of automation, which in turn benefits the cutting accuracy.

It is also advantageous to mechanically separate the feed device and the movement device in order to ensure a consistent layer thickness, in particular when producing thin sections from large samples (especially small ratio of layer thickness to lateral thin section extent).

The microtome furthermore has a liquid volume which abuts the cutting edge on the side facing away from the sample holder. The liquid volume consists of a liquid, preferably water or an aqueous solution, alternatively an alcohol (e.g., ethanol, glycol, etc.). The liquid should be selected such that it neither dissolves nor reacts with the thin sections. The liquid volume furthermore has a liquid surface which preferably has a preferably constant distance from the cutting edge over the entire cutting edge length, or more preferably extends up to the cutting edge.

A feature according to one or more embodiments is a channel which is arranged laterally on the side of the cutting edge facing away from the sample holder and which can be displaced toward and/or away from the cutting edge. The channel and the aforementioned liquid volume are thus located on the same side of the cutting edge, while the sample holder with the sample is arranged on the other side. The channel is designed to be open toward the cutting edge.

It can be filled with a liquid, wherein the liquid is either the aforementioned liquid of the liquid volume, a further liquid or a mixture of the two liquids.

The channel preferably has a channel bottom formed by a substrate. The substrate preferably forms a slide (more preferably a rigid slide) for at least one thin section for subsequent light and/or electron microscopy (e.g. scanning electron microscopy) and must be adapted for this purpose. The slide preferably consists of a transparent or electrically conductive material (in particular indium tin oxide, CNT, carbon, $WS_2$, $MoS_2$, heterostructures, conductive polymers, etc.) coated glass or a section of a silicon wafer (coated or uncoated).

Even more preferably, a channel is provided with a channel bottom formed by a substrate which is permeable to electron beams and is thus suitable, for example, for transmission electron beam microscopy. The aforementioned TEM substrates (grids and coated grids, etc.) come into consideration for this purpose.

In this respect, a wafer should be understood to mean a substrate. Such a substrate is configured in such a way that, for example, at least one electronic chip and/or at least one integrated circuit and/or at least one connecting element which provides at least one electrically conductive or electro-optical connection between such chips and/or integrated circuits can be formed thereon. Such a substrate is formed at least from a semiconductor material from the group of semiconductor materials, this group comprising: in particular silicon, but also germanium, carbon or other elemental semiconductors or also compound semiconductors, such as SiC, AlN, etc., or organic semiconductors. The substrate can be formed, for example, as a disk, polyhedron, rectangle or any desired geometric shape.

The channel preferably has, in particular on the sides not facing the cutting edge, mechanical side walls which confine the channel and the liquid flowable therein.

Alternative designs of a channel boundary provide for preferably structured surface functionalization of the substrate or the channel bottom, preferably by subdividing the substrate into liquid- or water-repellent (hydrophobic) and liquid- or water-attracting (hydrophilic) regions. The surface functionalization and thus the ability of the liquid to bond are preferably brought about by surface structuring, by means of coatings or impregnations or by chemical activation of substrate regions. Liquid and thus accessibility for the thin sections therefore reach only to the liquid-attracting or hydrophilic substrate or channel bottom regions, which advantageously increasingly facilitates exact placability of the thin sections, in particular for increasingly small channel dimensions (capillary effect).

If the channel is pushed toward the cutting edge, the open end of the channel preferably also penetrates into the liquid volume. If no liquid was contained in the channel before, the channel is flooded with the liquid of the liquid volume. If a liquid was contained in the channel before, the liquid in the channel and in the liquid volume come into contact, with the two liquids which come into contact preferably being identical or miscible. In both cases, a common liquid surface extends from the cutting edge over the liquid volume into the channel, allowing transfer of the thin sections from the cutting edge into the channel.

If the channel is pushed away (removed) from cutting edge again, preferably with at least one thin section, the liquids and the surface are separated into channel and liquid volume. While the liquid volume preferably remains unchanged at the cutting edge, the liquid in the channel forms a separate quantity of liquid which can be evacuated or removed separately from the channel.

The channel preferably has means for draining (e.g., removing, suctioning) and/or introducing (e.g. adding, supplying, feeding) at least one of the liquids into/out of the channel. The suction and/or introduction into the channel regions preferably takes place via a plurality of openings opening into the channel, preferably via open-pored regions in the channel, such as channel boundaries, more preferably the channel bottom or the side walls. Distributing the suction and/or introduction among a plurality of openings minimizes the formation of flows in the channel and thus the risk of undesired movements of thin sections, for example on a substrate.

It is optionally proposed that the openings be arranged in such a way and suction or supply of liquid via these openings be designed in such a way that flows in the channel can be formed and controlled and/or regulated so that they allow for specifiable manipulations and transports of the thin sections in the channel.

Furthermore, it is optionally proposed that means be provided above the channel, preferably having at least one nozzle outlet opening for generating an air flow, wherein the at least one nozzle outlet opening and thus the air flow can be directed into the channel. These means make it possible to manipulate the sections on the liquid surface by means of an air flow from above, surface waves, as well as by a laterally introduced substrate (e.g., foil) to which the sections attach through formation of a meniscus and by movement of which they can be manipulated.

The aforementioned liquid volume at the cutting edge preferably has no separate means for suctioning and/or introducing at least one of the liquids. The volume is preferably stabilized on the cutting edge by means of the surface tension of the liquid or, in the case of larger volumes, by corresponding walls or surface functionalizations of the abutting regions. If only one liquid is used, the amount of liquid is preferably regulated by means of the channels when inserting a channel into the liquid volume. If, on the other hand, different liquids are provided in the liquid volume and in the channel, separate means for suctioning and/or introducing at least one of the liquids into the liquid volume must be provided for feeding the liquid volume.

A further preferred embodiment is the arrangement of a plurality of channels next to one another, preferably in parallel to one another on a common substrate. The channels of the substrate are then preferably guided serially to the cutting edge and into the liquid volume and filled with thin sections or rows of thin sections. In principle, the channels are guided as described by back and forth movement of the open channel end to the cutting edge. This is effected by movement, preferably back and forth, i.e., by change of direction with the same orientation away from the cutting edge, with a switch to the next channel being achieved by an additional lateral advancing of the substrate with the channel openings. An alternative embodiment provides for the back and forth movement to be designed without a change in direction, for example in that the substrate with the channel openings is pulled past in parallel to the cutting edge, i.e., the back and forth movement takes place by a preferably lateral and/or straight-line shearing movement between channel opening and cutting edge.

A preferred embodiment of the microtome comprises a device for discharging separable liquid droplets from above onto the liquid or thin sections on the liquid above the cutting edge and/or the channel. It serves in particular for isolating or separating two thin sections floating on a liquid surface and adhering to one another after they have been serially peeled off from the sample at the cutting edge and received by the liquid surface and have arranged themselves thereon serially in a row. In particular, an isolated drop applied in a liquid between two thin sections arranged serially on the surface above the liquid volume causes the two thin sections to move away from one another.

The present disclosure further provides a method for producing thin sections from a sample with a microtome as described above. The method furthermore comprises the following method steps, preferably in the chronological order indicated:

1. Providing the microtome of the kind previously described with the sample holder for the sample, the cutting edge for cutting the sample, and the liquid volume with a liquid surface abutting the cutting edge.
2. Clamping the sample into the sample holder as previously described.
3. Moving the substrate with a channel to the liquid volume and to the cutting edge, the channel either being filled as described above by the liquid of the liquid volume or by the means for introducing a liquid or already containing a liquid. The moving process produces a common liquid surface of the liquid volume and the liquid in the channel as a transport medium for the peeled-off thin sections.
4. Starting from the aforementioned initial position, initiating a relative movement between the sample in the sample holder and the cutting edge in the cutting direction, wherein the sample is guided to the cutting edge,
5. Cutting through the sample by the cutting edge, wherein a thin section is peeled off the sample by one cut, preferably in the aforementioned cutting plane, with a cut surface being formed on the remaining part of the sample. The cut surface and the cutting plane preferably form a common plane. The cutting edge completely penetrates the sample in the cutting plane.
6. Receiving the thin section on the liquid surface of the liquid volume. One end of the thin section preferably continues to adhere to the cutting edge. In this case, the thin section is subsequently detached from the cutting edge and completely transferred to the liquid surface.
7. Transporting the thin section on the liquid surface into the channel.

The channel is then preferably removed with the thin section from the liquid volume at the cutting edge. By subsequent removal of the liquid in the channel through the aforementioned means for suctioning, the thin sections located on the liquid surface are dried and are positioned on the channel bottom, preferably a substrate or a slide.

The following subsequent method steps are optionally proposed to better detach a peeled-off thin section from the cutting edge:

8. Retracting the sample to the initial position.
9. Starting from the aforementioned initial position, initiating a relative movement between the sample in the sample holder and the cutting edge in the cutting direction, wherein the sample is guided to the cutting edge,
10. Passing the cutting edge through the sample edge, wherein the cut surface slides on the cutting edge without another cut being made since the sample is not supplied. A thin section which may still adhere to the cutting edge is thereby detached.

As an alternative to method steps 8 to 10, better detachment of a peeled-off thin section from the cutting edge can be carried out via the following optional method steps:

11. Retracting the sample to the initial position.
12. Feeding the sample holder with the sample in the feed direction into a further initial position.
13. Starting the next cut, preferably a few microns, preferably between 5 and 20 µm, into the sample.
14. Reversing the direction of movement of the cutting device and backing out of the cut (moving the sample upward). In this case, the thin section adhering to the cutting edge bonds adhesively to the sample, wherein the sample is pulled along during retraction and thereby detaches from the cutting edge.
15. Further retracting the sample from the cutting edge, wherein the thin section also detaches from the sample and is removed from the cutting edge on the liquid surface.

If a plurality of thin sections is serially peeled off from a sample and pushed into the channel in a row on the liquid surface, the method comprises the following further method steps:

16. Retracting the sample to the initial position.
17. Feeding the sample holder with the sample in the feed direction into a further initial position.
18. Repeating steps 4 to 7 as well as 16 and 17, wherein the peeled-off thin sections are serially arranged on the liquid surface above the liquid volume and transported into the channel, i.e., preferably over the substrate.
19. If necessary, manipulating the sections by laterally introducing a substrate, as a result of which the sections attach to the substrate by formation of a meniscus between section and substrate and can thus be moved along by displacement thereof.

For transferring the thin sections to the substrate, a method comprising at least one of the following optional method steps is proposed:

20. Suctioning, draining or evaporating the liquid volume from the cutting edge,
21. Removing the channel from the cutting edge and/or
22. Suctioning, draining or evaporating the liquid from the channel.

A particular advantage of the method is achieved in that a channel with peeled-off thin sections can be removed from the microtome and conveyed to further processing, while following thin sections can be received by another channel pushed to the cutting edge.

In a preferred arrangement of a plurality of adjacent channels on the substrate, the substrate is laterally displaced to the next channel and steps 1-7 are repeated until all channels on the substrate are occupied. Thus, a further advantage is that a plurality of thin sections can be placed next to one another in a plurality of channels on the substrate.

The microtome shown in FIG. 1 comprises a cutting edge 1, preferably made of a diamond wedge 2, and a liquid volume 3 abutting the cutting edge. The microtome furthermore comprises a channel 4 with substrate 5 and side walls 6 which are inserted into the liquid volume 3 as shown. The liquid in the liquid volume also extends into the channel 4. Four serially peeled-off thin sections 7 of a sample, not shown further, in a sample holder 20 are located one next to the other on the liquid surface. The microtome also includes a movement device 21 for generating a relative movement between the sample holder and the cutting edge for cutting the sample and a feed device 22 for generating a relative movement between the sample holder and the cutting unit.

Open-pored regions 23 are provided in the channel 4 for draining and/or introducing at least one liquid, and a device 24 for discharging separable liquid droplets onto the liquid or thin sections on the liquid are further provided.

The flow chart in FIG. 2 shows the individual method steps of a preferred method for producing thin sections from a sample with a microtome. The individual steps are explained in more detail by means of a schematic representation with reference to FIGS. 3a to 3h. The views and top views as well as the components shown in FIGS. 3a to 3h correspond to those shown in FIG. 1, for which reason reference numerals have been omitted with reference to FIG. 1.

Figure 3:
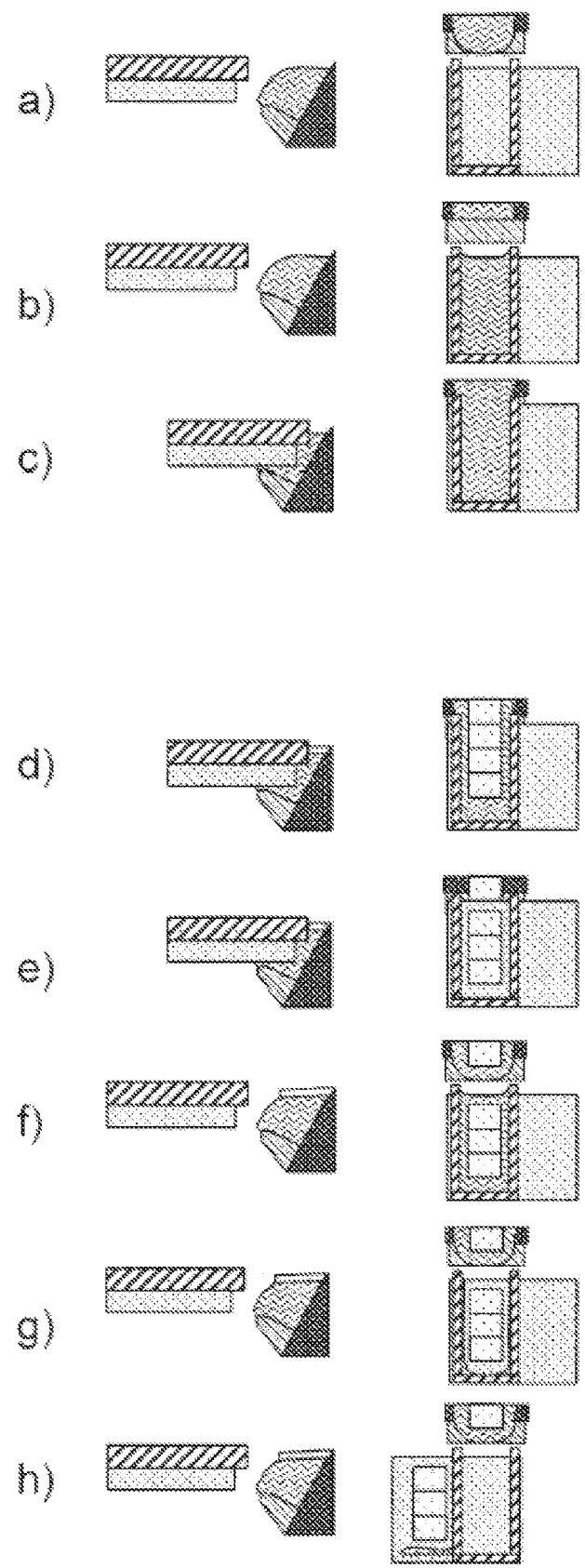
FIGS. 3a) to 3h) are schematic representations of preferred embodiments in accordance with the method steps shown in FIG. 2.

The method illustrated by way of example begins, at step 8, with a filling of the liquid volume at the cutting edge (if this has not yet happened) and, at step 9, a filling of the channel with liquid (e.g., water); the channel is still outside the liquid volume which is forming (FIGS. 3a and b). At step 10, the channel is then pushed to the cutting edge, causing the liquids in the channel and the liquid volume to combine to form a common liquid surface (FIG. 3c, in particular top view on the right). At step 11, the level of the liquid surface his then corrected through introducing or suctioning the aforementioned liquid. The microtome is thus ready for the production of thin sections. At step 12, there follows a serial peeling off of a plurality of thin sections at the cutting edge, which are pushed into the channel on the aforementioned liquid surface as a sequence of thin sections serially lined up one after another (FIG. 3d). At step 13, if a sequence of thin sections fills the channel over its entire or part of its length, the sequence of thin sections is separated between two thin sections in the region of the open end of the channel by means of an aforementioned and not further depicted device for discharging separable liquid droplets from above onto the thin sections on the liquid. The drop, which is applied between two thin sections arranged serially on the liquid surface above the liquid volume, causes the two thin sections to move away from one another (cf. FIG. 3e, in particular top view on the right). At step 14, the channel is then moved away from the liquid volume and the cutting edge H, wherein in the example a thin section remains on the liquid volume at the cutting edge (cf. FIG. 3f, in particular top view on the right). At step 15, the channel separated from the liquid volume is then emptied, whereby the thin sections located in the channel come to rest on the substrate and are adhesively fixed (FIG. 3g, in particular top view on the right). At step 16, a further channel is then provided on the same substrate in front of the cutting edge (FIG. 3h, in particular top view on the right).

Figure 4:
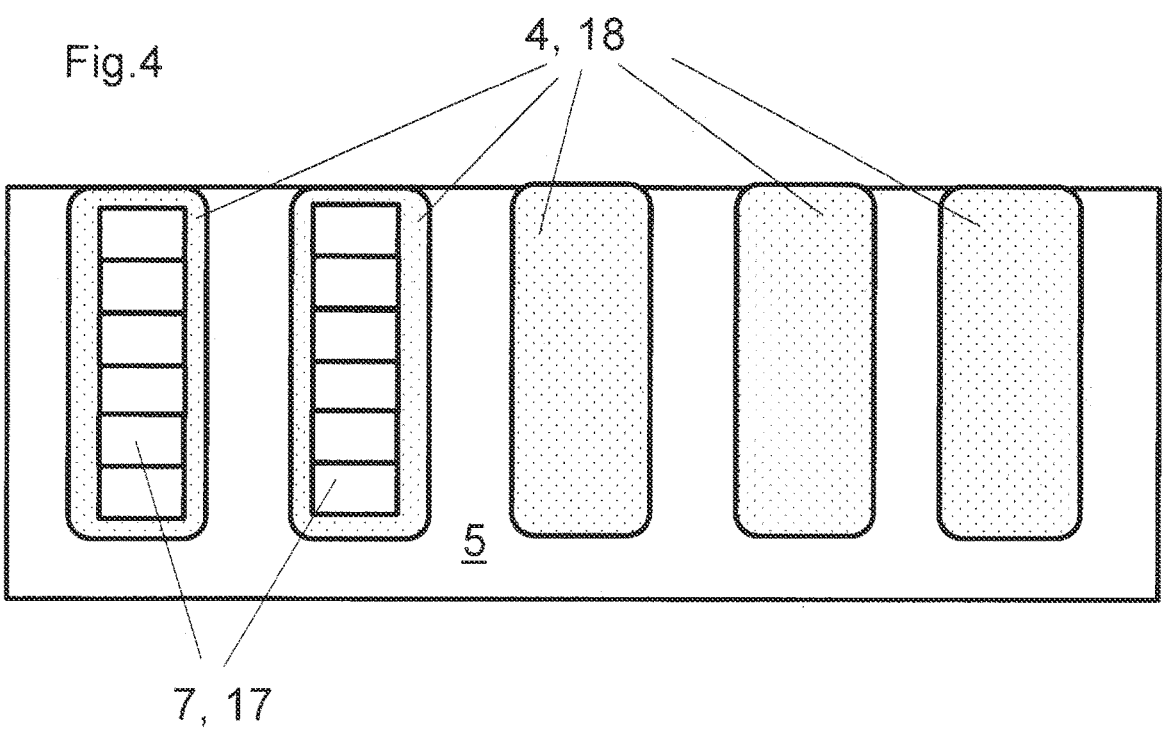
FIG. 4 is a schematic top view of an exemplary substrate in which channels are formed by liquid-attracting or hydrophilic regions and without side walls.

An optional design provides for a plurality of channels 4 on a common substrate 5 which are serially fillable by serial rows of thin sections 17 (FIG. 4). More preferably, and in a particularly advantageously space-saving manner, these channels 4 are formed by functionalized liquid-attracting or hydrophilic regional structuring 18 of the aforementioned type on an otherwise liquid-repellent or hydrophobic slide without lateral mechanical side walls around the channels. In this case, the open channel ends are realized as shown by extending the liquid-attracting or hydrophilic region structuring as far as the substrate edge and, more preferably, for a better fluidic connection to a liquid volume, around it onto the end faces of the substrate. In this embodiment, the channels are filled with liquid preferably via the liquid volume, alternatively by means of the aforesaid device for discharging separable liquid droplets from above onto the thin sections on the liquid (by diverting, for example, by means of a pipette arrangement).

A particularly advantageous embodiment of the substrate illustrated in FIG. 4 is created in that the liquid-attracting or hydrophilic region structure is formed on an otherwise liquid-repellent or hydrophobic slide by an open-pored substrate structuring. The water located in the channel can thus be two-dimensionally suctioned from below through the substrate structures underneath the rows of thin sections immediately after separation from the fluid volume by means of the aforementioned means for suctioning and/or introducing a liquid.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 Cutting edge
2 Diamond wedge
3 Liquid volume
4 Channel
5 Substrate
6 Side walls
7 Thin section
8 Filling of the liquid volume at the cutting edge
9 Filling of the channel with water
10 Combining the liquids in channel and liquid volume
11 Correcting the level of the liquid surface
12 Peeling off a plurality of thin sections
13 Separating the rows of thin sections between two thin sections
14 Moving away the channel from the liquid volume and the cutting edge
15 Dewatering/drying the channel
16 Providing another channel in front of the cutting edge
17 Row of thin sections
18 Liquid-attracting or hydrophilic region structuring

The invention claimed is:

1. A microtome for producing thin sections from a sample, comprising:
   a) a sample holder configured to receive the sample, b) a cutting edge configured to cut the sample, the cutting edge having a specified cutting direction, the cutting direction and the cutting edge spanning a cutting plane,
c) a movement device configured to produce a relative movement between the sample holder and the cutting unit for cutting the sample in the cutting direction,
d) a feed device configured to produce a relative movement between the sample holder and the cutting edge for cutting the sample in a feed direction at an angle not equal to 0° to the cutting plane,
e) a liquid volume with a liquid abutting the cutting edge on a side of the cutting edge facing away from the sample holder, and
f) a channel arranged laterally on the side of the cutting edge facing away from the sample holder and configured to move toward and/or away from the cutting edge at least via a back and forth movement, wherein the channel is open toward the cutting edge as an open channel end and is configured to be filled with the liquid and/or a further liquid.

2. The microtome according to claim 1, wherein a substrate forms a channel bottom of the channel.

3. The microtome according to claim 2, wherein the open channel end is arranged over an edge of the substrate.

4. The microtome according to claim 2, wherein the substrate is adapted for light and/or electron microscopy and is formed by a slide or a glass or silicon wafer coated with an electrically conductive material or a mesh or grid.

5. The microtome according to claim 4, wherein the slide is a slide made of an electrically conductive material or a material that is transparent to light and/or electrons.

6. The microtome according to claim 2, wherein a plurality of channels are arranged next to one another on the substrate.

7. The microtome according to claim 2, wherein the channel above the substrate away from the cutting edge is bounded on the substrate by mechanical side walls or by a structured surface functionalization of the substrate.

8. The microtome according to claim 1, wherein means are provided for suctioning and/or introducing at least one of the liquids into/out of the channel.

9. The microtome according to claim 8, wherein the means comprise open-pored regions in the channel.

10. The microtome according to claim 1, wherein a device is provided for discharging separable liquid droplets from above onto the liquid or thin sections on the liquid above the cutting edge and/or the channel.

11. The microtome according to claim 1, wherein the back and forth movement comprises lateral and/or straight-line shearing movements between the channel opening and the cutting edge.

12. A method for producing thin sections from a sample by a microtome, the method comprising:

a) providing the microtome, the microtome including a sample holder for the sample, a cutting edge configured to cut the sample, and a liquid volume with a liquid surface abutting the cutting edge,
b) clamping the sample into the sample holder,
c) moving a channel to the liquid volume and to the cutting edge,
d) starting from an initial position, initiating a relative movement between the sample in the sample holder and the cutting edge in a cutting direction, wherein the sample is guided to the cutting edge,
e) cutting through the sample by the cutting edge, wherein a thin section is peeled off the sample by one cut, with a cut surface being formed on a remaining part of the sample,
f) receiving the thin section on the liquid surface of the liquid volume, and
g) transporting the thin section on the liquid surface into the channel.

13. The method according to claim 12, further comprising:
h) retracting the sample to the initial position,
i) feeding the sample holder with the sample in the feed direction into a further initial position, and
j) repeating steps d) to i),
wherein
k) the peeled-off thin sections are arranged serially on the liquid surface above the liquid volume and transported into the channel.

14. The method according to claim 13, wherein at least one isolated drop of a liquid is applied between two thin sections arranged serially on the surface above the liquid volume, whereby the two thin sections move away from one another.

15. The method according to claim 12, further comprising:
l) starting from an initial position, initiating a relative movement between the sample in the sample holder and the cutting edge in the cutting direction, wherein the sample is guided to the cutting edge,
m) cutting by the cutting edge between 2 and 1000 μm into the sample,
n) reversing the relative movement by moving the sample upward, and
o) moving the sample further upward from the cutting edge into the initial position.

16. The method according to claim 12, further comprising at least one of:
p) suctioning, draining or evaporating the liquid volume from the cutting edge,
q) removing the channel from the cutting edge, and/or
r) suctioning, draining or evaporating the liquid from the channel.

* * * * *